US006061303A

United States Patent [19]

Gauthier et al.

[11] Patent Number: 6,061,303

[45] Date of Patent: May 9, 2000

[54] PROGRAMMABLE TIME RECORDER

[75] Inventors: Walter P. Gauthier, Westford; Peter Nikolla, Southbridge; Michael K. Poon, Westford, all of Mass.; Robert B. Staubitz, Collinsville; Timothy C. Repp, New Hartford, both of Conn.

[73] Assignee: Simplex Time Recorder Company, Gardner, Mass.

[21] Appl. No.: 09/132,422

[22] Filed: Aug. 11, 1998

Related U.S. Application Data

[62] Division of application No. 08/368,988, Jan. 5, 1995, Pat. No. 5,793,707.

[51] Int. Cl.[7] .............................. G04B 47/00; G01D 9/00; G01D 15/04

[52] U.S. Cl. ................................ 368/10; 346/20; 346/80; 346/82

[58] Field of Search .............................. 368/10; 340/691, 340/686, 815.01; 346/20, 80, 82–84

[56] References Cited

U.S. PATENT DOCUMENTS

| | | | |
|---|---|---|---|
| 2,968,521 | 1/1961 | Gross | 346/85 |
| 3,019,074 | 1/1962 | Leeser | 346/85 |
| 3,641,314 | 2/1972 | Abramson . | |
| 3,893,028 | 7/1975 | Febvre et al. | 324/115 |
| 3,975,743 | 8/1976 | Trischler et al. . | |
| 4,362,392 | 12/1982 | Kumata | 368/82 |
| 4,542,286 | 9/1985 | Golarz | 235/377 |
| 4,603,335 | 7/1986 | Koyasu | 346/17 |
| 4,693,329 | 9/1987 | Hikita | 177/4 |
| 4,823,080 | 4/1989 | Lin | 324/175 |
| 5,189,408 | 2/1993 | Teicher . | |
| 5,767,868 | 6/1998 | Sugiuchi et al. . | |

OTHER PUBLICATIONS

“Model 2300 Elapsed Time Recorder,” Star Systems Incorporated, Houston, Texas, Instruction Leaflet.

PIX–10 Electronic Time Recorder, Operation Manual, Amano Cincinnati Inc., 4 pgs., 1993.

PIX–3000 Series, Electronic Time Recorder, Operation Manual, Amano Cincinnati Inc., pp 1–22.

Centennial Installation, Operating and Programming Instructions, Simplex Time Recorder Co., pp 1–20, 1988.

*Primary Examiner*—Vit Miska

*Attorney, Agent, or Firm*—Hamilton, Brook, Smith & Reynolds, P.C.

[57] ABSTRACT

A time recorder includes a digital display and a printer for printing selected information including time, date, comment and number. A removable cover covers programming text which surrounds the display. During programming, the cover is removed to expose the text and accept and change buttons which allow a user to accept or change entries in several printing and other categories. Programming entries are indicated either directly or through codes which are described in the programming text. Customized comments may be generated by a user. A character count is maintained on the display during programming. The display is inverted by the user to allow orientation of the time recorder for table or wall mounting.

6 Claims, 14 Drawing Sheets

PROGRAMMABLE TIME RECORDER

RELATED APPLICATION

This application is a divisional of Ser. No. 08/368,988 filed Jan. 5, 1995, U.S. Pat. No. 5,793,707, the entire teachings of which are incorporated herein by reference.

BACKGROUND OF THE INVENTION

A widely used form of time recorder which has been used over decades is the time stamp. In such recorders, print wheels are rotated with the time of day. After a paper document such as a sheet or card is inserted into a slot, the print wheels are punched down to impact the document through an ink ribbon and thus imprint the correct time of day. Such time stamps may also include an engraved comment such as RECEIVED or PAID which is also printed on the document. Additionally, print wheels may be used to incrementally number successive documents.

In recent years, the engraved time and number wheels and comments have been replaced by dot matrix printers. The time recorders are microprocessor based so that they can be programmed by the user to set time, date, number sequence, comments and printing format. Typically, the time and date are set by the user using buttons while observing the time and date on a recorder display. Other features such as the comment to be printed and print format are typically selected by the use of codes programmed into the recorder using dip switches or programming buttons.

SUMMARY OF THE INVENTION

Programming of prior time recorders has generally required an infrequent user to rely on a manual to identify the procedures and codes required for programming. The present invention is directed to several features of a time recorder which greatly facilitate programming of the time recorder through an intuitive process.

In a preferred embodiment of the invention, a time recorder comprises a display of the time of day and a printer for printing selected time, date and other information such as comment and number. A removable cover covers an area about the display on which programming text, including code menus, is fixed. Programming buttons are also provided behind the cover. Processing electronics include a program stored in memory for controlling the display and printer and for programming date, time, print format and other information in response to user input through the programming buttons. Preferably, the programming buttons are accept and change buttons. The processing electronics cause a cursor to step to programming categories identified by the programming text as the accept button is pressed. When the change button is pressed, the system enters a reprogramming mode for the programming category identified by the cursor. In each reprogramming mode, the electronics flash a display entry which indicates the programmed state of the programming category. The state is identified directly, as by time and date alphanumerics on the display, or through a code defined in a list in the programming text adjacent to the cursor. The processing electronics change the displayed state when a user presses the change button and programs to the displayed state when a user presses the accept button.

Using the accept and change buttons, the recorder can be fully programmed using only two buttons. Prior systems which have utilized only two buttons have relied on yes and no or enter and change buttons which have had different meanings dependent on whether the user was identifying a programming category or making a specific entry once the reprogramming mode to that category had been entered. With the present system, the user always presses the change button when he wishes to change the displayed entry and an accept button when he is satisfied with the entry regardless of whether he is using the buttons to enter a reprogramming mode or to change an entry once in that mode. In all cases, the user accepts or changes a displayed entry. The user need not consider the concept of entering a reprogramming mode for a particular category as has been required in past systems. The result is a reversal of the choice of the yes and no switches previously used to enter a reprogramming mode. Whereas a yes previously indicated a desire to enter a particular reprogramming mode and later a desire to maintain an entry, with the present system the accept (or yes) button initially indicates satisfaction with the displayed entry and thus prevents entry into a reprogramming mode. On the other hand, pressing the change (no) button indicates dissatisfaction with the displayed entry and thus enters into a reprogramming mode. This simple change to the use of the two buttons greatly simplifies the user's intuitive use of the system.

In all cases, the information required for programming is available to the user, either on the display or in the surrounding text. There is no requirement to search a manual for proper procedures or codes. In all cases, the information being programmed into the recorder is either directly displayed, for example as time or date alphanumeric information, or identified by a code on the display which can be immediately interpreted using the programming text associated with the selected category.

A particularly novel aspect of the preferred system includes the ability to invert the display. Inverting the display allows the time recorder to be used as a front entry table unit or as a top entry wall mounted unit.

During programming, a character count is provided on the display to indicate the total number of characters which have thus far been selected by the user for printout. Since the dot matrix printer is limited in the number of available characters, the character count allows the user to make most appropriate use of the limited printing space.

While past time recorders have enabled a limited number of standard comments to be printed, the preferred embodiment of the present invention also enables the comments to be customized using the same accept and change buttons used during the remainder of the programming process. The customized comment may be generated by scrolling through alphanumeric characters with the change button and selecting individual characters with the accept button.

In a preferred time recorder, a single cursor is stepped to individual printing format categories. The preferred programming categories include print order, date format, time format and comment. Additional categories may include daylight savings time, move ahead and move back dates, language, print activation mode, print direction, print justification, plural alarm settings, printed number digits, repeat count, starting number and display direction.

Also provided is a novel time card which allows for proper alignment of print spaces on the time card with a printer in the time recorder. A leading edge of the time card has a sinusoidal edge which abuts a guide pin in the time recorder to shift the card axially for proper alignment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
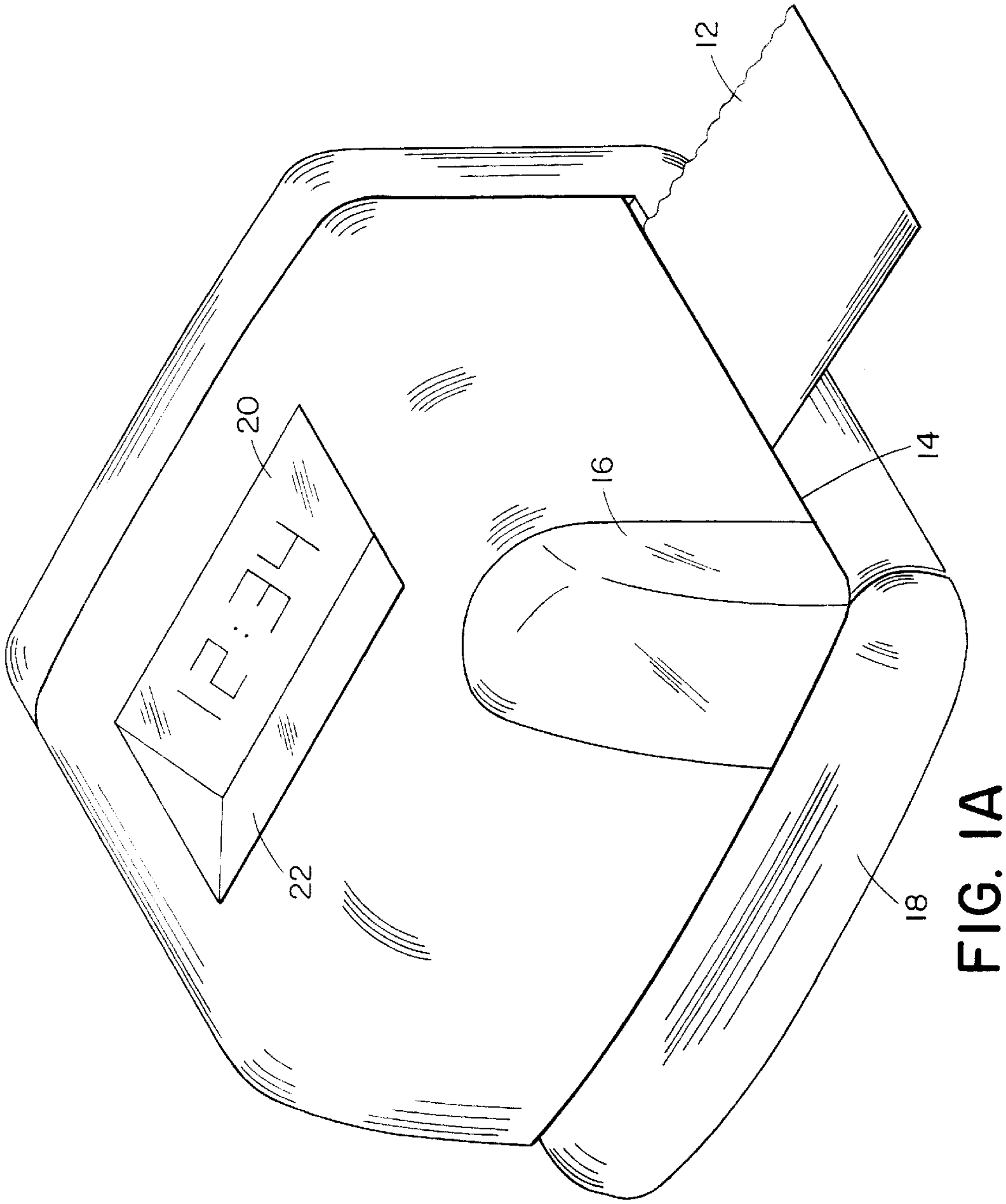
FIG. 1A is a perspective view of a time recorder embodying the present invention oriented to be supported on a table.

FIG. 1A illustrates a time recorder embodying the present invention. It is intended to meet such applications as time stamping, job costing and time and attendance. A time card 12 or other document is manually inserted into a slot 14 and slid against a margin stop within the recorder. Targeting of the print on the document is performed by viewing the document through a window 16 and aligning the document with a print area outline presented in the recorder next to the print head. The position of the document 12 within the time recorder and the resultant margins are controlled by slide levers which are accessible from the bottom of the unit to control a back stop within the recorder. The margin settings control the location of the printing of up to 20 characters of print.

Figure 1B:
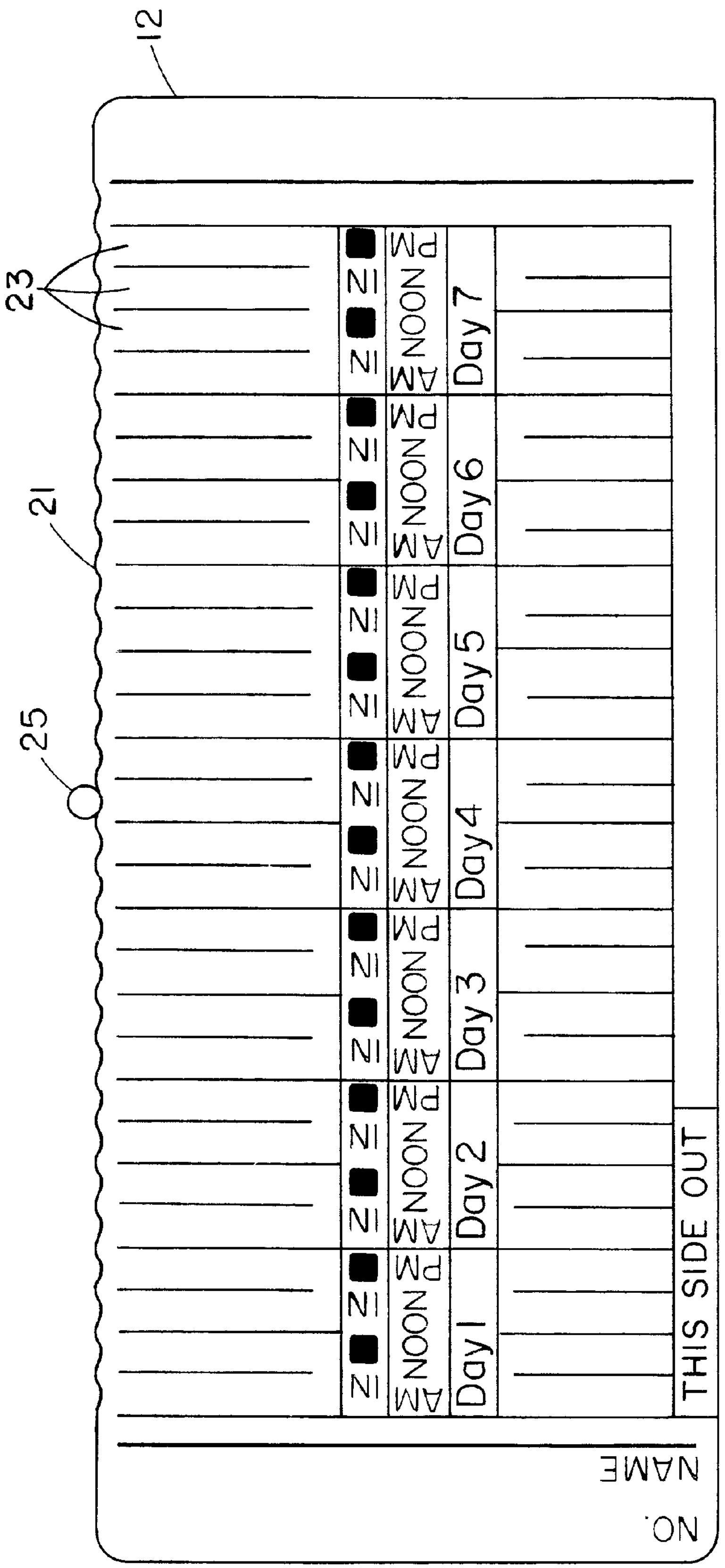
FIG. 1B illustrates a time card used in the time recorder of FIG. 1A.

For fine positioning of the time card within the time recorder, the time card may be provided with a serpentine edge 21 which co-acts with one or more guide pins 25 at the backstop within the recorder to locate the card such that the printer is precisely aligned with one of the print lines 23 of the card. If the card is inserted slightly off center relative to one of the lines, one of the leading portions of the sinusoidal edge will strike the guide pin. Continued easing of the card inward into the time recorder causes the card to slip along the pin axially until it rests at a trailing portion of the sinusoid as illustrated in FIG. 1B. It can then be assured that the printer is precisely aligned at the center of one of the print lines 23.

Printing may be activated by one of three methods. With a manual setting of the recorder, the printing is activated by pressing a print bar 18 at the front of the unit. Registration of the document is not required. The automatic setting causes the unit to print when an inserted document trips a sensor mounted on the margin stop. In the semi-automatic mode, the recorder prints on a document when the document is sensed at the margin stop and the manual print bar 18 is pressed.

At all times, the time and date are shown on a display 20 which is preferably a segmented liquid crystal display. The display is viewed through a window 22.

Figure 2:
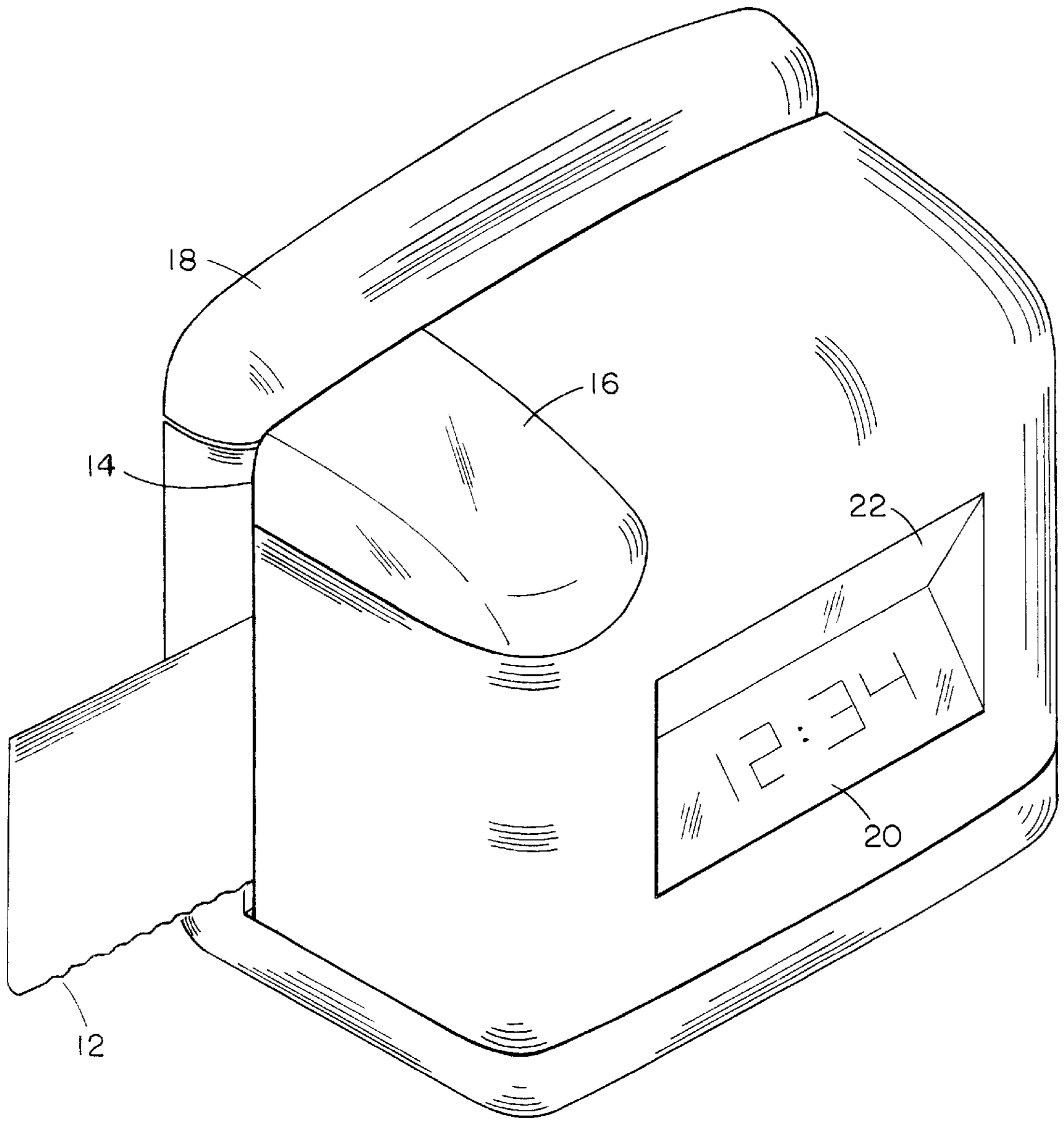
FIG. 2 is an illustration of the time recorder of FIG. 1 oriented to be mounted on a wall and with the display inverted.

A feature of the time recorder of FIG. I is that it can be reoriented as illustrated in FIG. 2 for mounting on a wall. In this orientation, the document is dropped into the slot 14. This reorientation of the time recorder requires that the display 20 be inverted. The display direction can be programmed by the user as discussed below.

Figure 3:
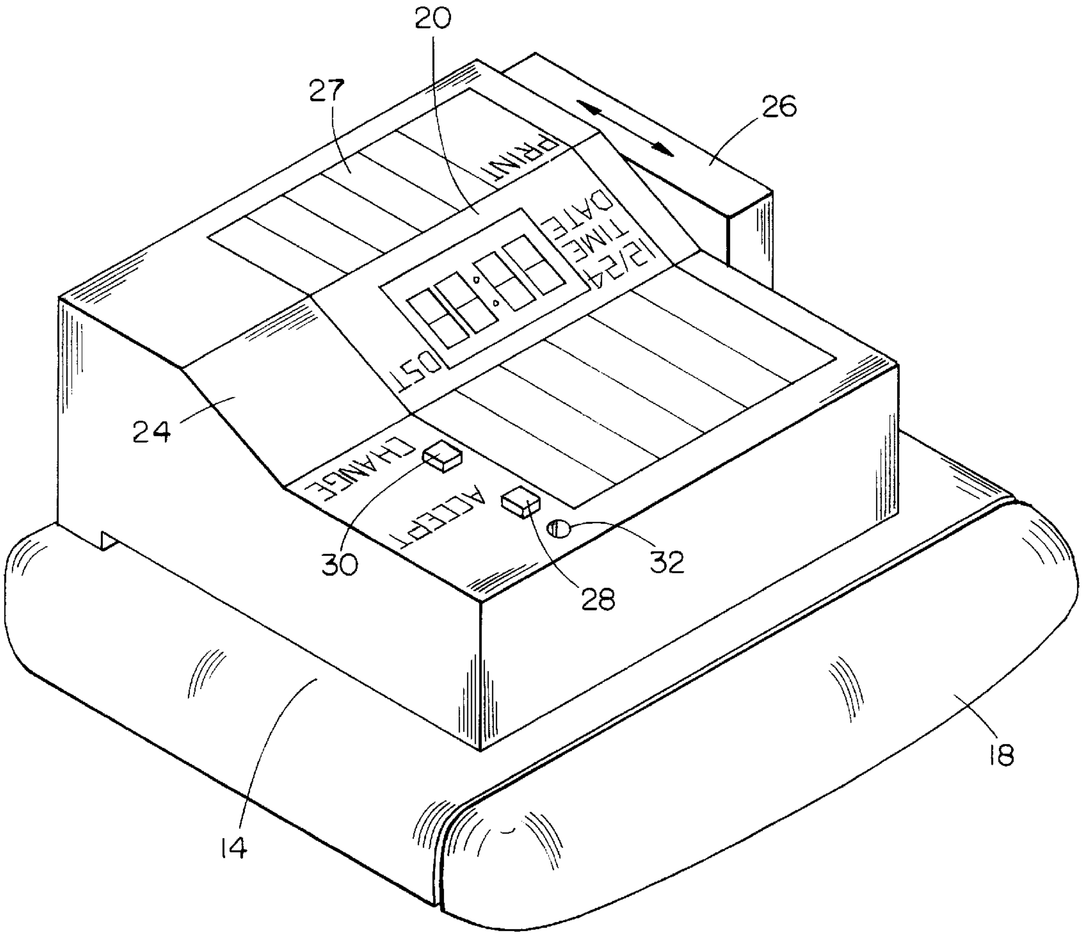
FIG. 3 is a perspective view of the time recorder oriented as in FIG. 1 but with a top cover removed to expose the programming features of the present invention.

In order to program or otherwise service the time recorder, the cover is removed to expose an internal housing as shown in FIG. 3. As shown, the display 20 which is viewed through the window 22 of the top cover is positioned on an angled surface 24. A reciprocating dot matrix printer assembly 26 may also be seen. During printing, a clamping mechanism holds the document in place as the printer assembly 26 moves forward and prints the preprogrammed information on the document. The document is then released as the printer mechanism is returned to a start position.

As illustrated in FIG. 3 and as will be described in greater detail with respect to FIGS. 5 and 6, the display is surrounded by a template 27 which includes programming data used during the programming operation. The language used in the template, which is simply an adhesive-mounted label, is selected according to the destination market of a particular recorder. Full programming is by means of accept and change buttons 28 and 30 to be described below. Access to a reset button to the microprocessor is provided through a hole 32.

Figure 4:
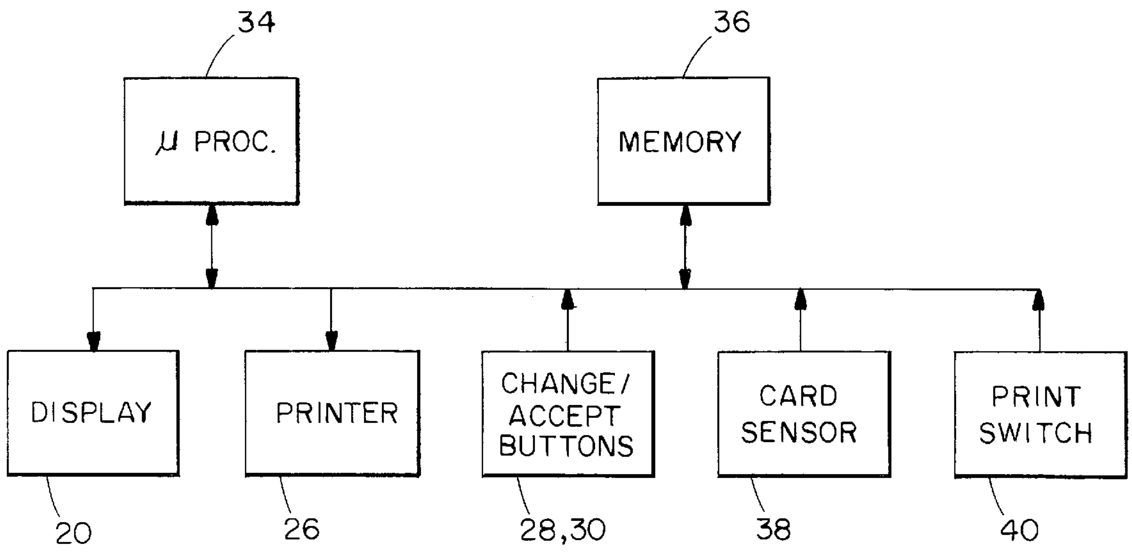
FIG. 4 is an electrical block diagram of the time recorder of FIG. 1.

A high level block diagram of the electronics of the time recorder is provided in FIG. 4. A microprocessor 34 processes a program stored in memory 36. Memory 36 also retains the user programmable data entered through the change and accept buttons 28 and 30 as described below. The microprocessor 34 controls the display 20 and responds to a card sensor 38 and the print switch 40 activated by the print bar 18 to control the printer assembly 26.

Figure 5:
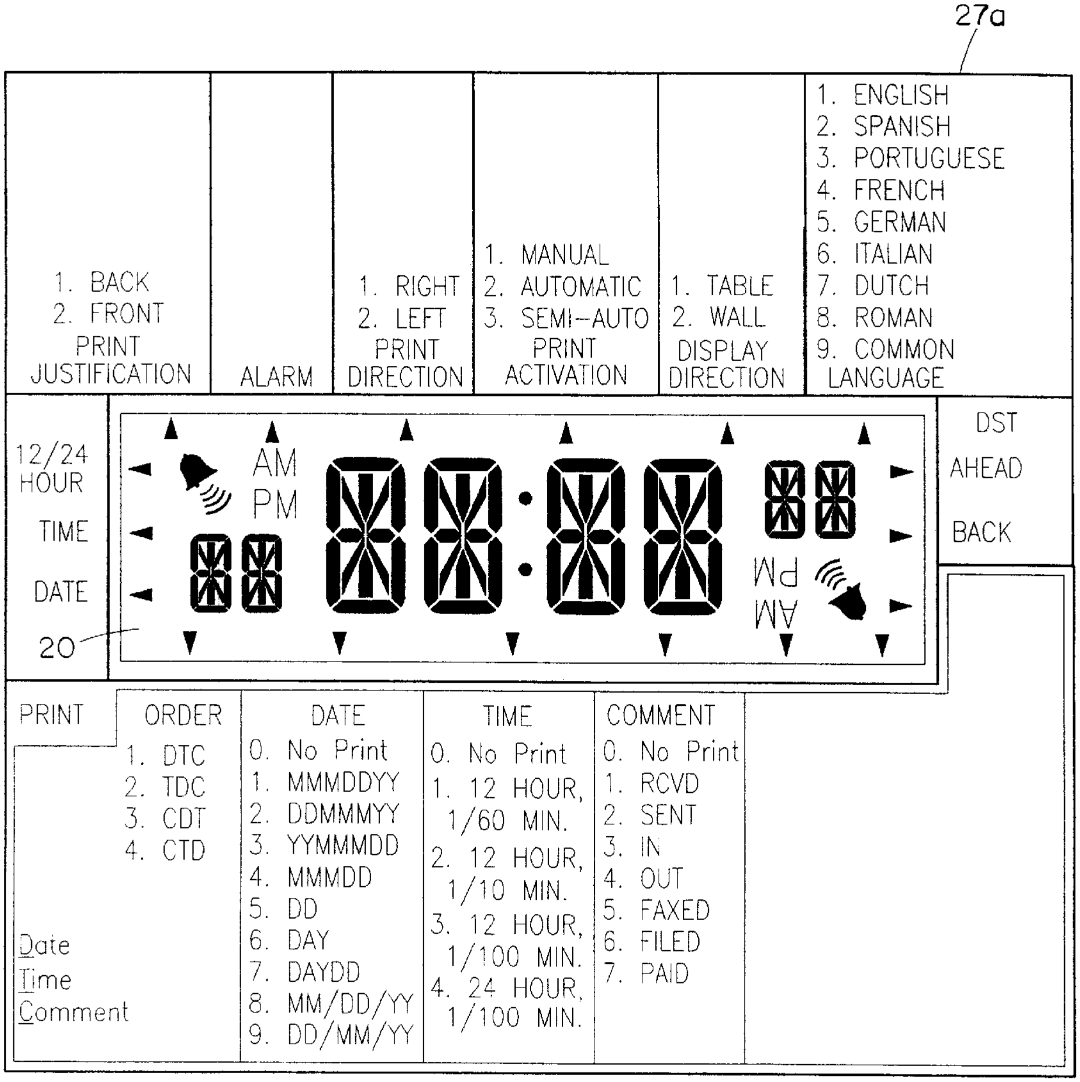
FIG. 5 is a plan view of the display and programming text overlay on the recorder of FIG. 3 in one embodiment of the invention.
Figure 6:
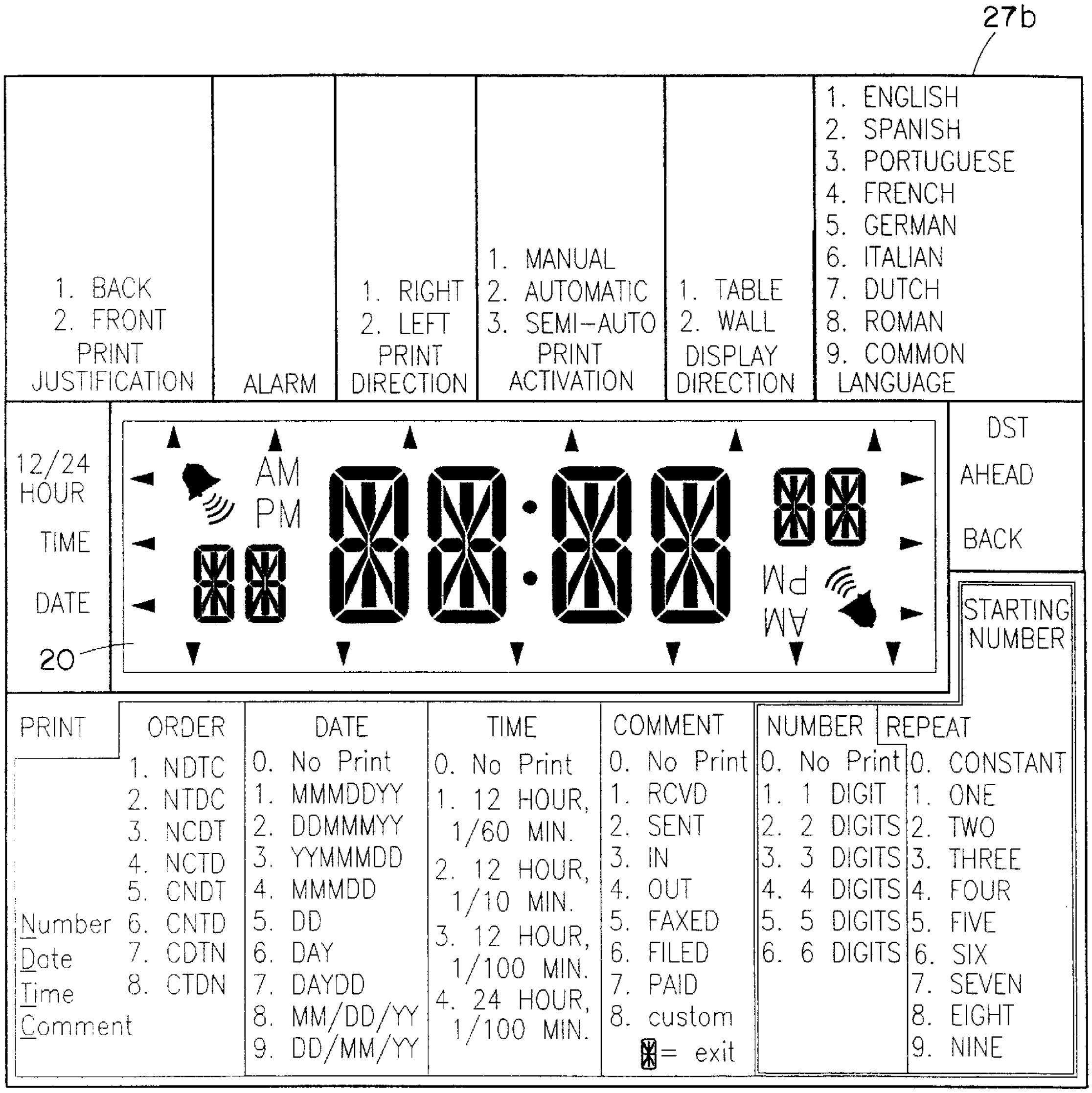
FIG. 6 is a plan view similar to FIG. 5 with extended programming features.

Details of the display 20 and the surrounding template are presented in FIGS. 5 and 6. The figures are identical but for the additional programmable numbering function available through the template of FIG. 6. Accordingly, the invention will be further described with respect to FIG. 6.

The display includes two pairs of alphanumeric elements separated by a colon for displaying the hour and minutes in normal operation. Two smaller alphanumeric elements are provided to the left of the display for normally displaying the current date, and smaller elements are provided to the right of the display for displaying the day of the week. When the display is programmed with a 12 hour format, one of the am/pm elements is illuminated. A bell icon is used to identify programming of an alarm function. Surrounding the display are a number of arrowhead cursors which are selectively illuminated during the programming process which will now be described in detail with respect to FIG. 6 and the flow chart of FIGS. 7A–F.

The programming paradigm is as follows. If the user wishes to change an entry, the change button is pressed; if a user accepts a displayed entry, the accept button is pressed.

Following the basic paradigm, programming is initiated by pressing the change button. One of the programming categories defined by the template surrounding the display is identified by a flashing arrowhead cursor. At the same time, the entry for that programming category is presented on the display. The user can decide to accept that entry by pressing the accept button or to change the entry by pressing the change button. With acceptance, the cursor moves to the next category. Thus, so long as the entries are accepted, the cursor makes a full circle around the display to each category. If the user wishes to change the entry, he merely hits the change button. This moves the processor into a reprogramming mode for the programming category then identified by the cursor. In the reprogramming mode, an entry which can be changed flashes. The changeable entry may be a portion of the full entry, such as hours within the time entry, it may be the full entry or it may be a code number which is fully defined by the template in a list adjacent to the cursor. In each case, the user need only decide whether to accept the displayed entry or to change it. If the change button is pressed, the entry is incremented, either in directly displayed information such as hours or in code, until the user reaches the entry to be accepted. In general, continuously holding the change button advances the setting more quickly.

Figure 7A:
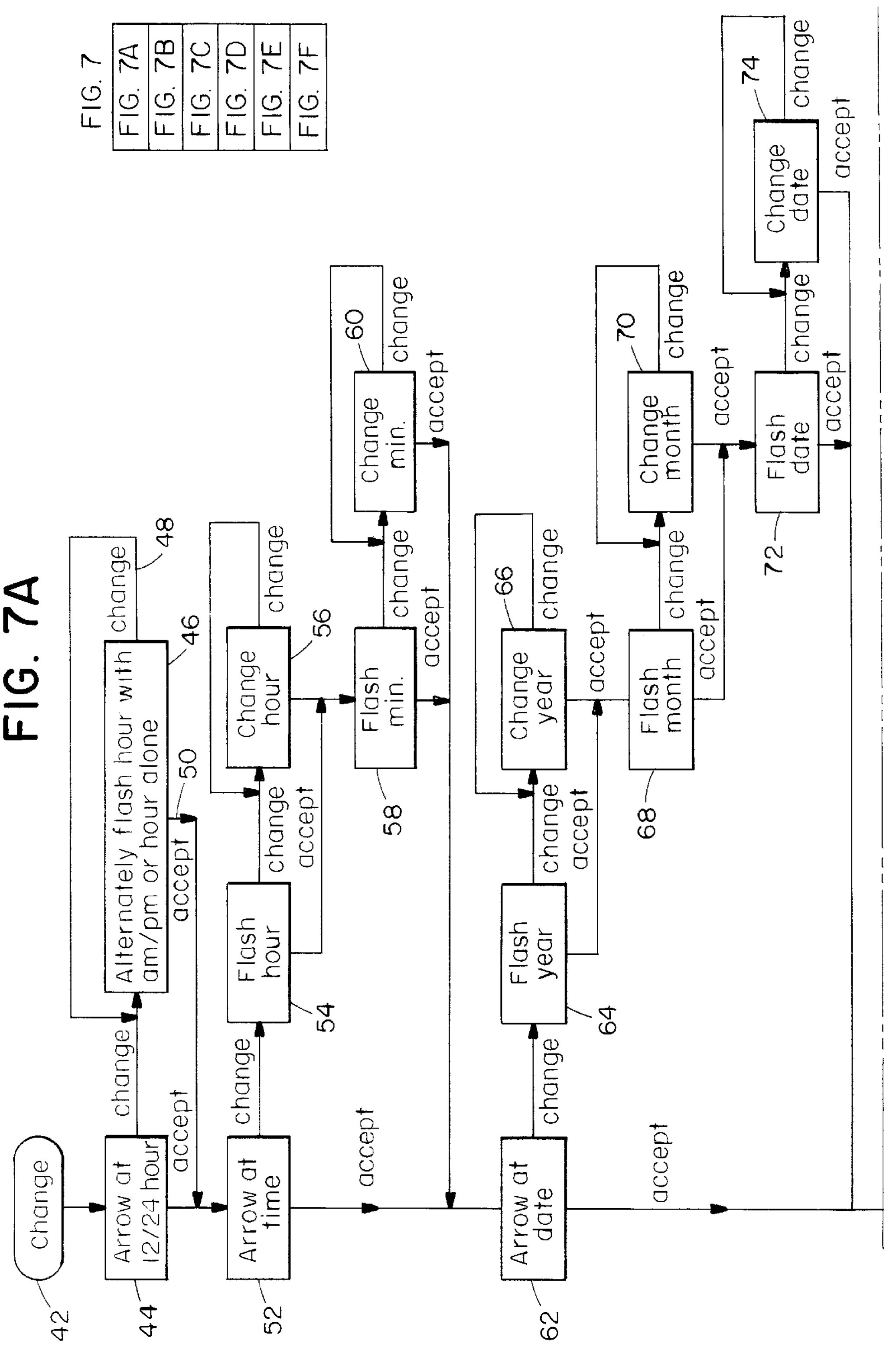
FIGS. 7A, B, C, D, E and F together form a flow chart for programming the time recorder having the text overlay of FIG. 6.
Figure 7B:
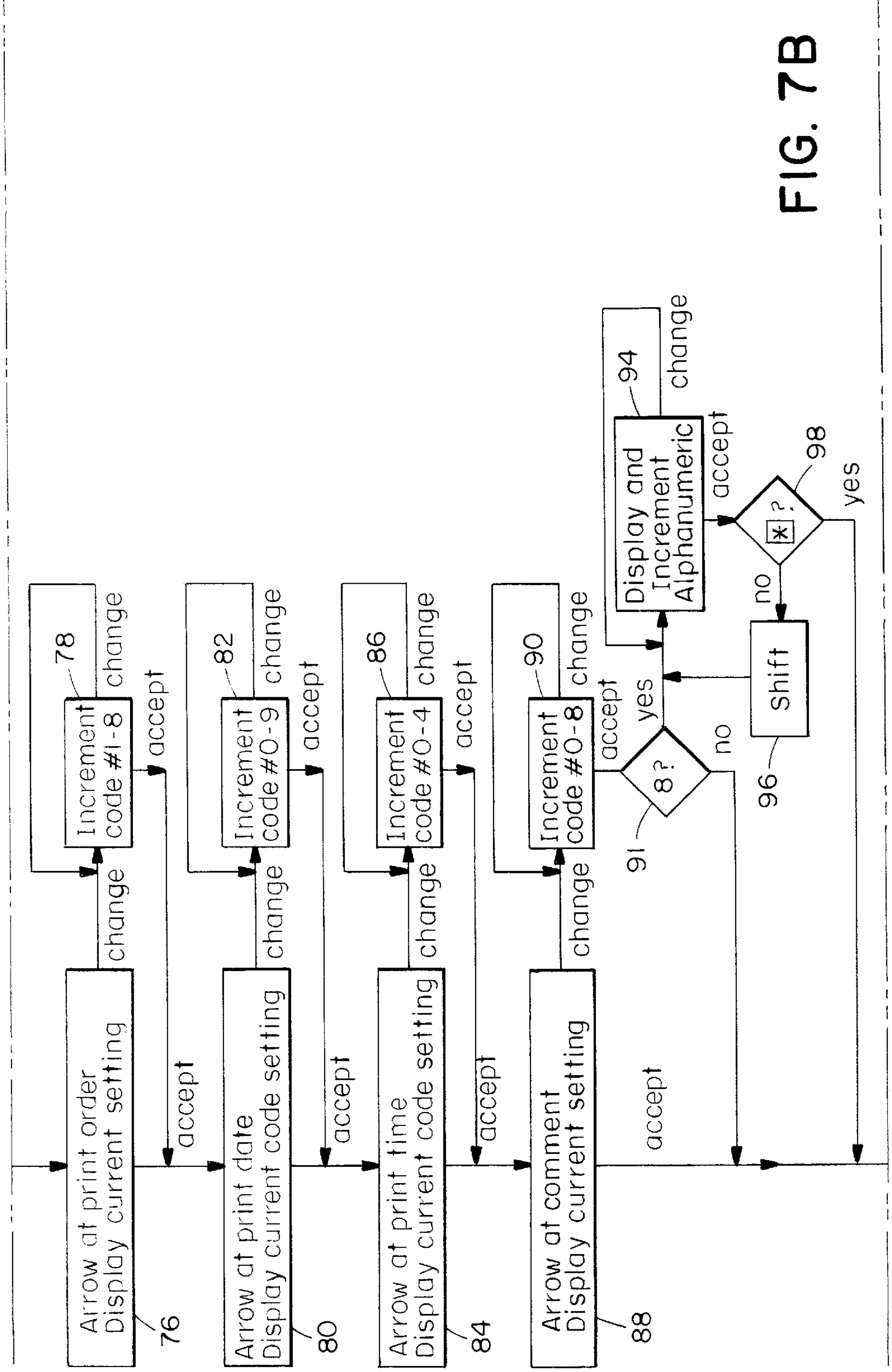
Figure 7C:
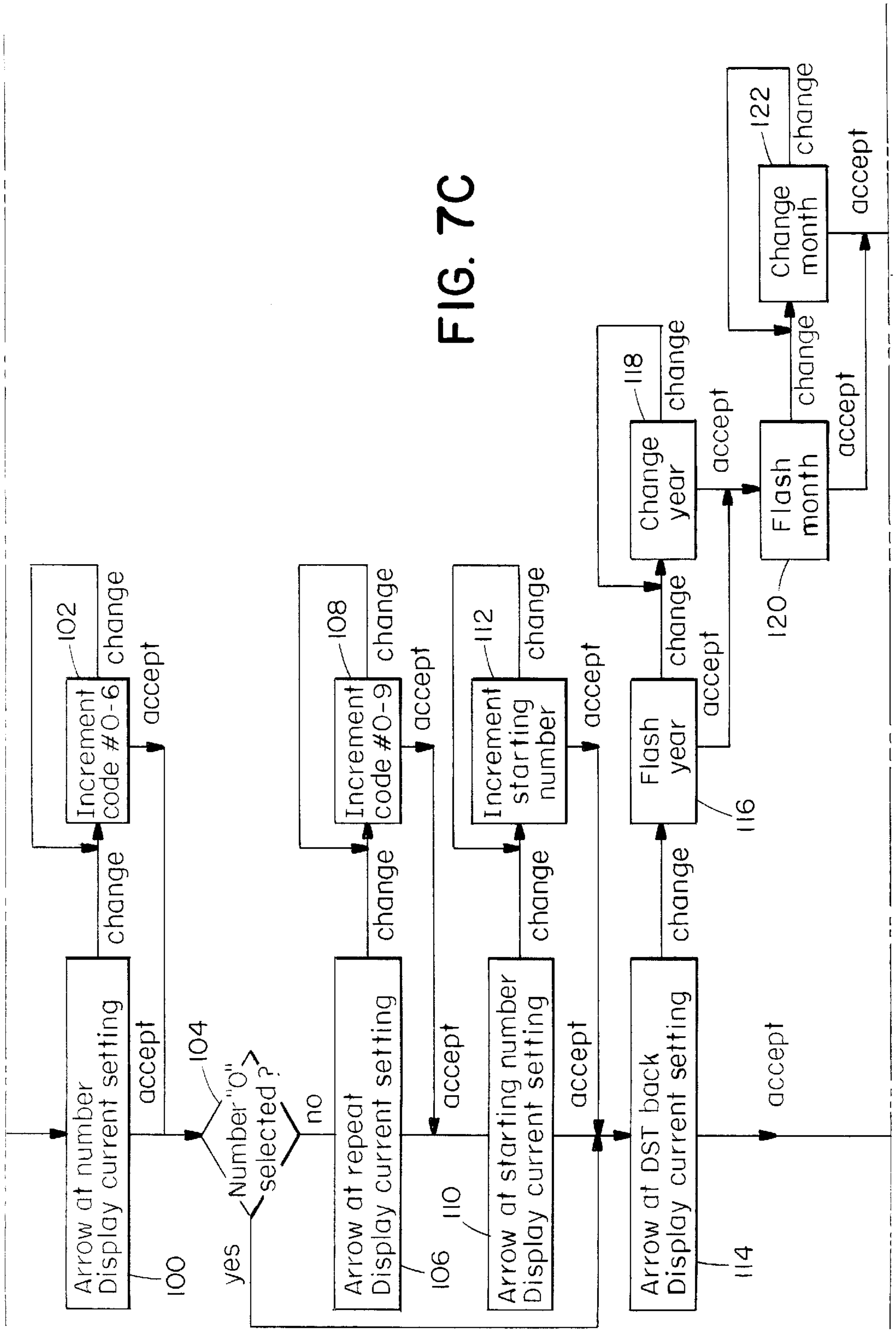
Figure 7D:
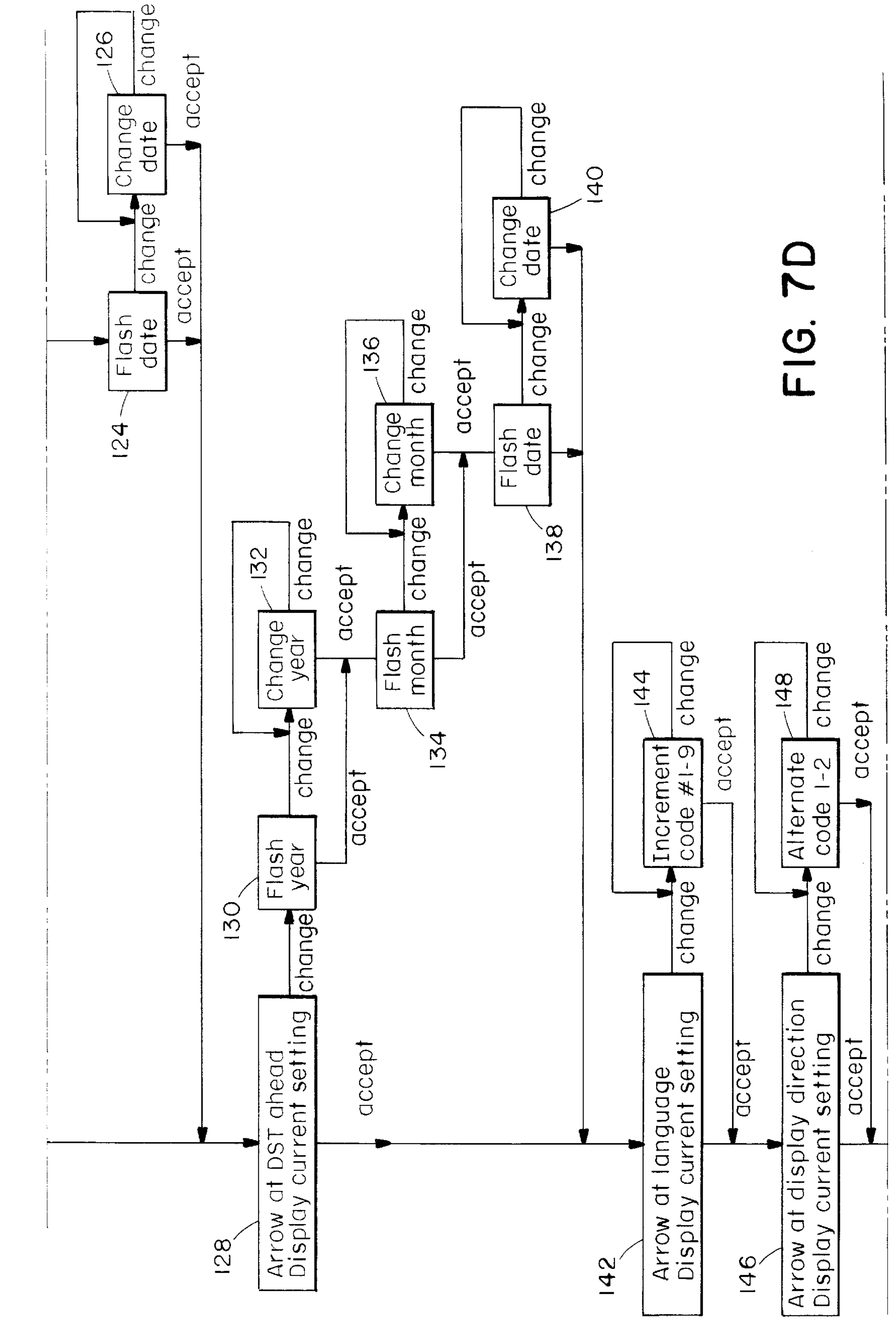
Figure 7E:
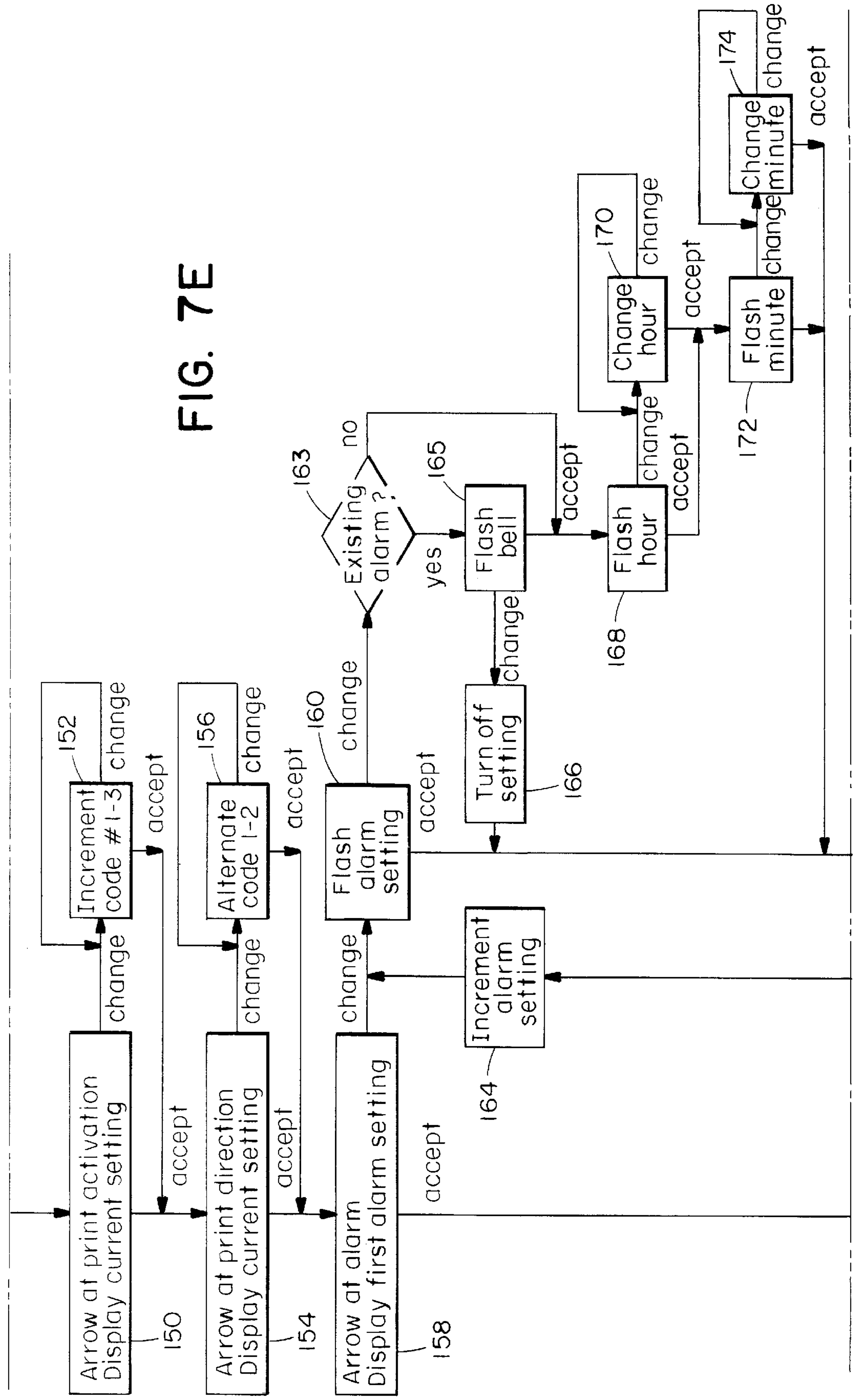
Figure 7F:
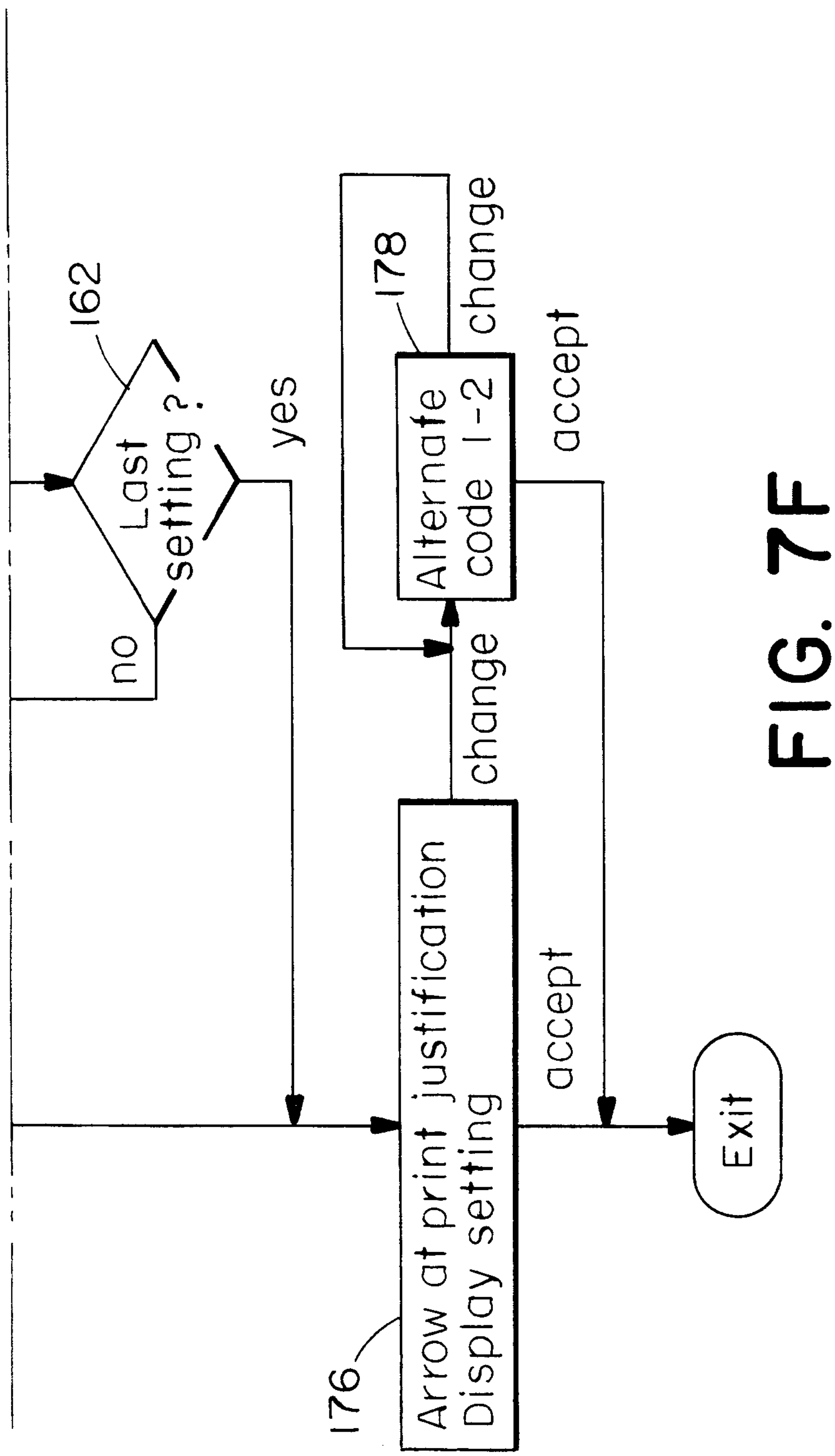

When the change button is first pressed at 42 in FIG. 7A, the system at 44 illuminates and flashes the cursor arrow at the 12/24 hour location to the left of the display. Dependent on the current setting of the recorder, either the am/pm display flashes with the hour or the hour flashes alone at 46. By hitting the change button, the system alternates between the two modes. By hitting the accept button at 50, the then displayed mode is retained and the time setting arrow starts flashing at 52.

If the user had pressed accept with the initial display at 44 of the arrow adjacent to the 12/24 hour template indication, the system would not have entered the reprogramming mode and would simply have moved to 52 with flashing of the arrow at the time indication. In fact, it can be seen from FIGS. 7A–F that by simply accepting the current setting at each location of the arrow as it moves about the display, the system rapidly moves through the programming sequence to any programming category which the user wishes to change.

From 52, if the change button is pressed, the arrow stops flashing and the current hour flashes at 54. If the change button is then pressed, the hour setting is advanced at 56. Pressing the accept button at either 54 or 56 sets the recorder clock at the displayed hour and causes the current minute display to flash at 58. Pressing the change button causes the minute display to advance at 60, and acceptance at either 58 or 60 by pressing the accept button exits the time reprogramming mode and moves the flashing arrow to the date indication at 62.

If the change button is then pressed, the arrow stops flashing and the current year setting flashes in the lower left segments of the display at 64. Pressing the change button causes the year to advance at 66. Acceptance at either 64 or 66 causes the current month setting to flash before the colon at 68. Pressing the change button causes the month to advance at 70, and pressing the accept button at either 68 or 70 causes the date to flash after the colon at 72. Finally, the change button causes the date to change at 74, and acceptance causes the arrow to flash at the print order list at 76. The day of the week is automatically defined in the system from the date.

The printer output is defined by selecting the order and settings for date, time, comment and numbering. A maximum of 20 characters can be printed when selecting print setting. The total number of characters that have been selected are displayed in the lower left comer of the display. When choosing settings, the individual entry character length is displayed in the upper right comer. If more than 20 characters are selected, those over 20 will not be printed. Since the print order is defined by one of the codes 1 through 8, one of those digits representing the current setting is viewed on the display at 76. The order represents the order in which the programmed number (N), date (D), time (T) and comment (C) are printed on the document. The system is limited to eight potential orders, one of which is selected by the user. By pressing the change button, the system advances through the eight codes at 78 until one is accepted.

Once an order code has been accepted, the arrow at the print date flashes and the current date code setting is displayed at 80.Any item in the print order option can be eliminated by later selecting the no print option for that selection. By pressing the change button, the arrow stops flashing and the current setting flashes. The current setting can be advanced through the nine codes at 82. As seen in FIG. 6, the number of characters used in each option for each of the month (M), day (D) and year (Y) is indicated. An expanded description of those formats is presented below in Table 1.

Accepting a displayed date format code causes the arrow to flash at the print time column with display of the current time format code at 84. By pressing the change button, the code can be incremented at 86. A more detailed description of the possible time formats is presented in Table 2.

With acceptance of the time format code, the arrow at the comment programming category flashes at 88 and the current code setting for the comment is displayed. With pressing of the change button, the current setting flashes and that setting can be changed at 90. The user is able to select a preprogrammed comment (RCVD, SENT, IN, OUT, FAXED, FILED, PAID) or create a custom comment by choosing the number corresponding to the desired selection. To create a custom comment, the user selects the custom option code 8 and then spells out the desired comment from the available characters. The available characters are 0 through 9, A through Z and space. A character is selected by pressing the change button at 94 until the desired character is displayed. Pressing the accept button selects the displayed character, and the selected character moves to the left at 96 so the next character can be selected. Once the selection has been completed, the user presses the accept button when the null character (all character segments displayed) is displayed to exit at 98.

With acceptance of the preprogrammed or customized comment, the cursor flashes at the number list at 100. This option allows for the printing of a number which may be held constant or incremented from some starting number. The number of digits are selected at 100 and 102 to be any of one through six. If code zero is selected for the no print option to the numbering, that code is recognized at 104 to bypass the repeat and starting number options adjacent to the display. However, if one through six digits is selected, the arrow flashes at the repeat option at 106 and the current option code is displayed. The repeat option allows a number to be held constant or to be repeated for one through nine printouts before being incremented. The repeat count can be changed at 108.

With acceptance of the repeat count, the cursor arrow flashes at the starting number at 110. The starting number can be incremented at 112.

With acceptance of the starting number or selection of the no print option for the number, the cursor moves on to flash at the daylight savings time (DST) back option at 114. Here, the date at which the time is to move back one hour is displayed. If that setting is to be changed by hitting the change button, the current setting of the year flashes at 116 and the year can be changed at 118. With acceptance of the year, the month flashes at 120 and can be changed at 122. Finally, the date flashes at 124 and can be changed at 126.

With acceptance of the programming of the DST back option, the cursor moves to the DST ahead option at 128. To change the current setting, the change button is pressed. The year setting flashes at 130 and can be changed at 132, the month setting flashes at 134 and can be changed at 136 and the date setting flashes at 138 and can be changed at 140.

The cursor then flashes at the language listing and the current language code is displayed at 142. Any one of the languages of the list can be selected at 144. More detailed descriptions of the month and day printouts for each of the several languages is presented in Tables 3 and 4. Similarly, the comments would be changed to the selected language.

As noted above, the language of the template itself would be selected according to the destination market of a particular recorder.

TABLE 1

| Code | Line Format | Print | Number of Characters |
|---|---|---|---|
| 1 | month,date,year | AUG2594 | 8 |
| 2 | date,month,year | 25 AUG94 | 7 |
| 3 | year,month,date | 94AUG25 | 7 |
| 4 | month,date | AUG25 | 5 |
| 5 | date | 25 | 2 |
| 6 | day | MO | 2 |
| 7 | day,date | MO25 | 4 |
| 8 | month/date/year | 08/25/94 | 7 |
| 9 | date/month/year | 25/08/94 | 7 |

TABLE 2

| Line Format | Print | Number of Characters |
|---|---|---|
| 12 hour, 1/60 minute | pm2:47 | 6 |
| 12 hour, 1/10 minute | pm2.8 | 5 |
| 12 hour, 1/100 minute | pm2.78 | 6 |
| 24 hour, 1/60 minute | 14:47 | 5 |
| 24 hour, 1/100 minute | 14.78 | 5 |

TABLE 3

Month Printing Table:

| | | | | | | | | | | | | |
|---|---|---|---|---|---|---|---|---|---|---|---|---|
| English | JAN | FEB | MAR | APR | MAY | JUN | JUL | AUG | SEP | OCT | NOV | DEC |
| Spanish | ENE | FEB | MAR | ABR | MAY | JUN | JUL | AGO | SEP | OCT | NOV | DIC |
| Portuguese | JAN | FEV | MAR | ABR | MM | JUN | JUL | AGO | SET | OUT | NOV | DEZ |
| French | JAN | FEV | MAR | AVR | MM | JUN | JUL | AOU | SEP | OCT | NOV | DEC |
| German | JAN | FEB | MAR | ARP | MM | JUN | JUL | AUG | SEP | OKT | NOV | DEZ |
| Italian | GEN | FEB | MAR | APR | MAG | GIU | LUG | AGO | SET | OTT | NOV | DIC |
| Dutch | JAN | FEB | MRT | APR | MEI | JUN | JUL | AUG | SEP | OKT | NOV | DEC |
| Roman | I | II | III | IV | V | VI | VII | VIII | IX | X | XI | XII |
| Common | 1 | 2 | 3 | 4 | 5 | 6 | 7 | 8 | 9 | 10 | 11 | 12 |

Day Printing Table

| Language | Sunday | Monday | Tuesday | Wednesday | Thursday | Friday | Saturday |
|---|---|---|---|---|---|---|---|
| English | SU | MO | TU | WE | TH | FR | SA |
| Spanish | DO | LU | MA | MI | JU | VI | SA |
| Portuguese | DO | SG | TA | QA | QI | SX | SA |
| French | DI | LU | MA | ME | JE | VE | SA |
| Gemian | SO | MO | DI | MI | DO | FR | SA |
| Italian | DO | LU | MA | ME | GI | VE | SA |
| Dutch | ZO | MA | DI | WO | DO | VR | ZA |
| Roman/Common | 1 | 2 | 3 | 4 | 5 | 6 | 7 |

With selection of the appropriate language, the cursor arrow flashes at the display direction option at 146. The display direction corresponds to the table orientation of FIG. 1 or the inverted wall mounting orientation of FIG. 2. The appropriate direction can be selected at 148.

With acceptance of the display direction, the cursor arrow flashes at the print activation option at 150. As noted above, the printer can be activated manually by pressing the print bar 18, automatically with insertion of a document against a margin stop sensor or semi-automatically requiring both sensing of the document and pressing of the bar 18. The mode of operation can be changed at 152.

Figure 8A:
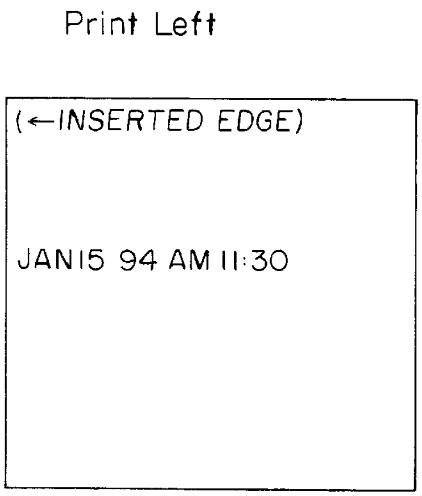
FIGS. 8A, B, C and D illustrate printing on a card where the time recorder has been programmed for different combinations of left and right print direction and back and front print justification.
Figure 8B:
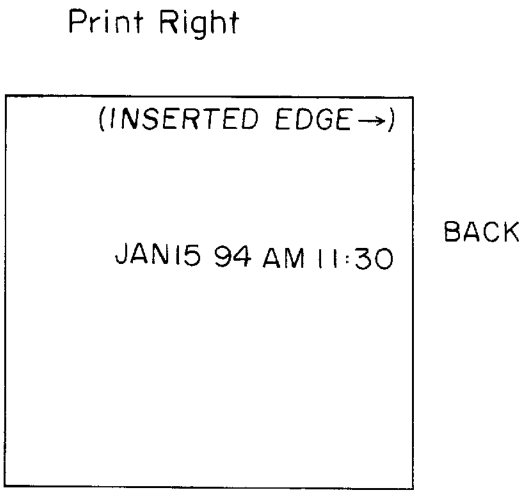

With acceptance of the print activation mode of operation, the cursor arrow flashes at the print direction option at 154. As illustrated in FIGS. 8A and 8B, print direction causes the print to start at the inserted edge or to finish at the inserted edge. In actual printing, the print right option prints the last of the 20 characters first and prints the characters upside down relative to the printing in the print left mode. Selection of a desired print direction may be changed at 156.

With acceptance of the print direction, the cursor arrow flashes at the alarm option and the first of 24 possible alarm settings is displayed. The alarm option allows for up to 24 alarm times to be programmed into the system. At each alarm time, the system sounds an alarm tone and may trip an alarm relay. The alarm settings are indicated by the four large characters in the center of the display as hours and minutes and the setting number (1–24) is indicated in the upper right side of the display.

When the change button is pressed at the alarm location, the first alarm setting flashes at 160. That alarm setting may be accepted to scroll through the various alarm settings at 162 and 164. If the change button is pressed at any flashing alarm setting 160, the system checks at 162 to determine whether the setting is an existing alarm setting. If so, the bell icon flashes at 164. Pressing the change button then turns off that alarm setting at 166. If the alarm setting was not an existing alarm at 163 or was accepted at 165, the hour setting is flashed at 168. The hour can be changed at 70. Similarly, the minutes of the current alarm setting flashes at 172 and can be changed at 174.

Figure 8C:
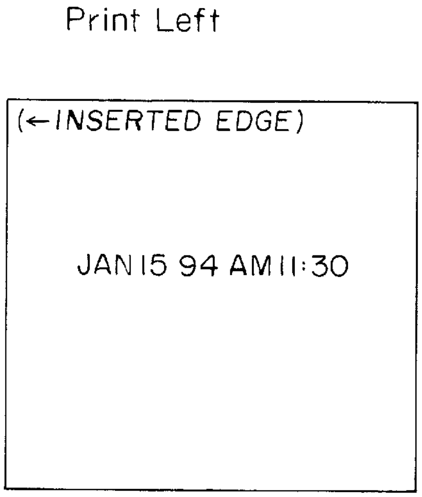
Figure 8D:
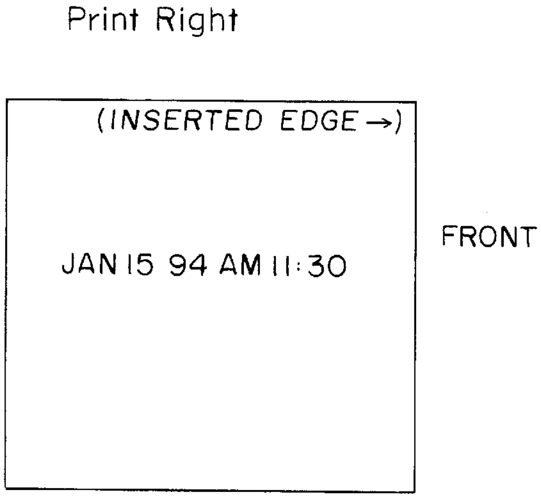

Once the final alarm setting has been accepted, the cursor arrow flashes at the print justification and the current setting is displayed at 176. Print justification is used when less than 20 characters are to be printed. It defines the location of the printed information to be to the front or to the back of the 20 character print field. FIGS. 8A and 8B illustrate the location of a 17 character field with the back print justification; the characters are justified to the back, inserted edge of the document. FIGS. 8C and 8D illustrate the front print justification with each print direction. If fewer than 20 characters are to be printed and the print justification is forward justified, the margin stop can be moved further forward to reduce the insertion depth of the document into the unit. The print justification can be changed at 178.

With acceptance of the print justification, the recorder exits the programming mode.

While this invention has been particularly shown and described with references to preferred embodiments thereof, it will be understood by those skilled in the art that various changes in form and details may be made therein without departing from the spirit and scope of the invention as defined by the appended claims.

In the claims, the terms accept and change referring to the buttons are intended to define the functions of the buttons and not necessary the actual labels used. For example, yes and no labels would be appropriate as well. The terms accept and change are better suited to the claimed functions of accepting or changing the displayed entries and distinguish prior art use of the yes button to first enter a reprogramming mode but then accept a reprogramming entry. With the present invention, the no key would cause the system to enter a reprogramming mode and would then reject unwanted entries.

What is claimed is:

1. A time recorder comprising:

a housing adapted to be set on a table to receive a sheet through a front slot and to be mounted on a wall to receive a sheet through the same slot oriented in a top position a display on the housing for displaying time of day;

a printer in the housing for printing selected time and date; and processing electronics including a stored program stored in memory for controlling the display and printer and for programming date and time, the processing electronics responding to user input to cause the display to operate in a first orientation for table mounted use of the time recorder and to invert the display to a second orientation for use in a wall mounted orientation.

2. A method of programming a time recorder comprising:

setting a time recorder on a table to receive a sheet through a front slot or mounting the time recorder on a wall to receive a sheet through the same slot oriented in a top position; and programming a display on the housing to cause the display to operate in a first orientation when the time recorder is set on a table and to invert to a second orientation when the time recorder is wall mounted.

3. A time recorder and time card combination comprising:

a time card comprising:

a plurality of printing spaces for printing time information; and a serpentine edge; and a time recorder comprising:

a printer; and a guide pin which abuts the time card as the card is inserted into the time recorder to shift the time card into proper alignment of a printing space with the printer in the time recorder.

4. A time recorder and time card combination as claimed in claim 3 wherein the serpentine edge is sinusoidal.

5. A method of printing on a time card comprising:

providing a time recorder having a printer and guide pin;

providing a time card comprising a plurality of printing spaces for printing time information and a serpentine edge; and inserting the time card into the time recorder such that the time card abuts the guide pin as the card is inserted into the time recorder to shift the time card into proper alignment of a printing space with the printer.

6. A method as claimed in claim 4 wherein the serpentine edge is sinusoidal.

* * * * *